United States Patent
Denisart et al.

(10) Patent No.: US 7,650,831 B2
(45) Date of Patent: Jan. 26, 2010

(54) METHOD AND DEVICE FOR PREPARATION OF A DRINK FROM CAPSULES CONTAINING A SUBSTANCE

(75) Inventors: Jean-Paul Denisart, La Conversion (CH); Patrick Caprotti, Lavauxn (CH); Jean-Luc Denisart, Cully (CH); Alfred Yoakim, St-Légier-la Chiesaz (CH); Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 674 days.

(21) Appl. No.: 10/568,785

(22) PCT Filed: Jul. 30, 2004

(86) PCT No.: PCT/EP2004/008566
§ 371 (c)(1),
(2), (4) Date: Feb. 16, 2006

(87) PCT Pub. No.: WO2005/020768
PCT Pub. Date: Mar. 10, 2005

(65) Prior Publication Data
US 2006/0225575 A1    Oct. 12, 2006

(30) Foreign Application Priority Data
Aug. 25, 2003  (EP) ................... 03019164

(51) Int. Cl.
*A47J 31/40* (2006.01)

(52) U.S. Cl. .......................... 99/283; 99/295; 99/302 R

(58) Field of Classification Search .................. 99/295, 99/302 R, 283, 287
See application file for complete search history.

(56) References Cited

U.S. PATENT DOCUMENTS

| | | | |
|---|---|---|---|
| 2,939,381 A | | 6/1960 | McBride |
| 3,139,343 A | * | 6/1964 | Baselt ..................... 426/394 |
| 3,403,617 A | | 10/1968 | Lampe |
| 5,398,596 A | * | 3/1995 | Fond ........................ 99/295 |
| 5,598,764 A | * | 2/1997 | Bambi ...................... 99/295 |
| 5,762,987 A | * | 6/1998 | Fond et al. ................. 426/433 |
| 6,148,717 A | * | 11/2000 | Lassota ..................... 99/283 |
| 6,772,676 B2 | * | 8/2004 | Lassota ..................... 99/283 |
| 6,786,134 B2 | * | 9/2004 | Green ..................... 99/289 P |

FOREIGN PATENT DOCUMENTS

| | | |
|---|---|---|
| DE | 37 22 554 C1 | 12/1988 |
| WO | WO 86/02537 | 5/1986 |
| WO | WO 02/074144 | 9/2002 |

* cited by examiner

*Primary Examiner*—Reginald L Alexander
(74) *Attorney, Agent, or Firm*—K&L Gates LLP

(57) ABSTRACT

The invention relates to a device for preparing a beverage by injection of water through a capsule containing a substance to be dissolved and/or to be extracted. The device comprises at least one water-injection system for introducing water inside the capsule. The injection system can be switched in order for a selection to be made between at least two different modes of wetting the substance so as to adapt wetting in accordance with the type of capsule and/or with the nature of the substance contained in the capsule. The invention aims to propose a device suitable for the preparation of a wider range of beverages, foaming or non-foaming, from substances to be extracted and/or soluble substances.

15 Claims, 16 Drawing Sheets

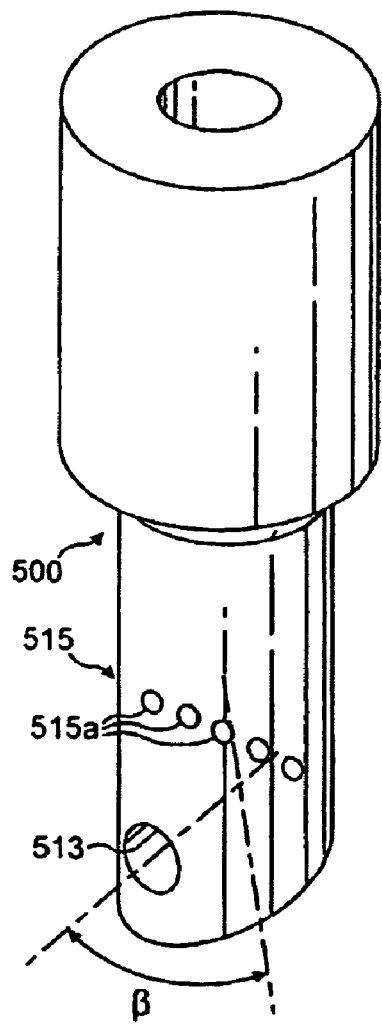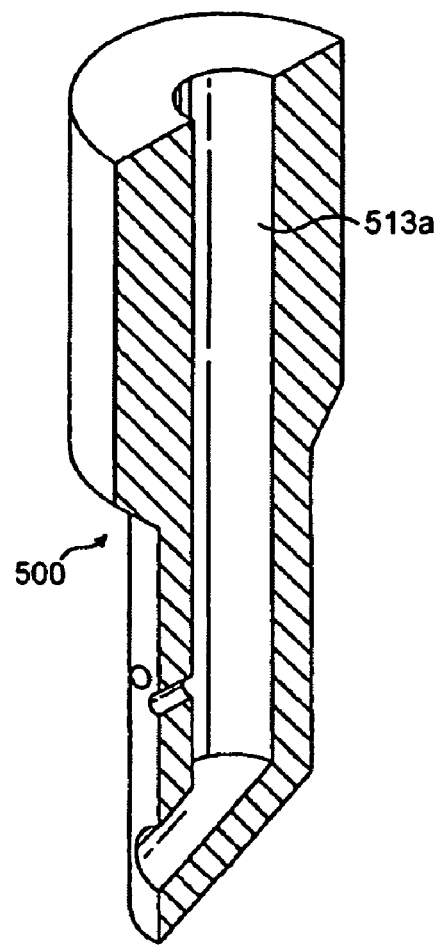
FIG. 16
FIG. 17

METHOD AND DEVICE FOR PREPARATION OF A DRINK FROM CAPSULES CONTAINING A SUBSTANCE

BACKGROUND

The present invention relates to methods and devices for preparing beverages using capsules containing a food substance, such as a substance to be extracted and/or to be dissolved. The invention relates more precisely to a method and a device for preparing, in an optimized manner, a variety of beverages from substances of different types.

The use of capsules containing a substance for preparing a beverage by extraction or by mixing under pressure is well known, particularly in the field of espresso-type coffees or soluble coffees, and is advantageous particularly for reasons of hygiene, storage freshness of the coffee and ease of use.

There are various machines for preparing beverages using "capsules" containing a substance to be extracted, such as ground coffee, tea or a substance to be dissolved or dispersed, such as soluble coffee, chocolate, milk or a mixture or simple combination of these substances.

The capsules may be closed capsules serving as a chamber for the injection of water and opening in order to release the liquid beyond a certain pressure threshold by means of the rupturing of a face of the capsule in contact with elements that are in relief. Water is usually injected by means of perforation through the capsule using a needle or spikes. An example of an extraction system of this type is described in Patent EP 0 512 470 B1 or, alternatively, EP 0 870 457. In the as yet unpublished European Patent Application No. 02000943.7, a description is given of a capsule having its own release-type means for rupturing a capsule film or membrane and thereby releasing the liquid extract when a pressure threshold has been achieved inside the capsule.

The capsules may also be permeable chambers of the filter type or, alternatively, semi-permeable chambers comprising a filter component.

It is known to use substances to be mixed (soluble or dispersible substances) and substances to be extracted under pressure using the same machine so as to offer a wider variety of beverages. For example, on one and the same machine, it is possible to prepare an "espresso" coffee when the capsule contains a ground coffee or a hot chocolate when the substance is a mixture of cocoa and powdered milk. However, it is observed that it does not suffice to fill a capsule with a different type of substance if a quality beverage—in terms of aroma, taste and/or volume of foam, for example—is to be obtained.

In particular, the injection, mixing or wetting conditions may have a considerable influence on the quality of the beverage produced. Depending on whether a substance, resulting from grinding, pressed down into a capsule is involved, or, alternatively, a substance to be dissolved or dispersed in a liquid, such as a soluble coffee or a milk-based substance such as a cappuccino, chocolate or the like is involved, the way in which the water circulates through the capsule has an influence on the extraction or mixing conditions and thus on the final quality of the beverage. Thus, a product such as coffee or chocolate has to be dissolved or dispersed rapidly and completely, producing, preferably, a foam; on the other hand, a soluble tea preferably has to be dissolved without producing foam. Dissolution or dispersion has to be total, homogeneous and rapid, without giving rise to lumps or froth. In the case of products to be extracted, such as ground coffee, the optimum wetting conditions are different. The product must be thoroughly wetted, thereby optimizing the water/coffee contact surface, without creating preferred routes for the water through the bed of coffee. The creation of a privileged route through the bed of coffee may result in too sudden an increase in pressure and thus too rapid a release of the extract despite the fact that the extraction time is insufficient and part of the coffee has not yet been correctly wetted.

The injection conditions may be improved, although this would only be in response to a particular problem or in connection with a particular substance. For example, Patent Application EP 1 299 022 A1 relates to a capsule cage comprising blades and a separate water entry for distributing the water through the capsule and eliminating the problems of obstruction and furring-up of the water-injection needles. For example, application EP 1 203 554 A1 relates to the shape of the piercing spikes for promoting water-flow conditions inside the capsule and preventing the rise of solid residues outside the capsule.

However, there are no known devices that aim to meet the different, often contradictory, resultant wetting requirements in the case of extraction or the mixing, with water, of a substance contained in a capsule. Consequently, known devices are ill-suited to the preparation, in a manner that is adapted on each occasion, of a wide range of beverages from substances of different types.

SUMMARY

The present invention aims to solve this problem and to propose a device that makes it possible satisfactorily to effect adapted preparation of a wider range of beverages from a wide variety of substances.

To that end, the invention relates principally to a device for preparing a beverage by injecting a quantity of water through a capsule containing a substance to be dissolved and/or to be extracted, comprising at least one water-injection system for introducing a quantity of water inside the capsule, characterized in that the injection system can be switched in order for a selection to be made between at least two different modes of wetting the substance so as to adapt wetting in accordance with the type of capsule and/or with the nature of the substance contained in the capsule.

The term "capsule" is understood in the broad sense as any type of refill element containing a substance without limitation of form or of component materials for the element. In particular, the capsule may be of impermeable, permeable or partially permeable type.

The injection system can be actuated to modify the injection configuration in accordance with at least two possible modes, the two modes having between them one or more distinctive features that include the injection direction, the number of injection spikes, and the radial and/or depth position of injection into the capsule.

The device is thus capable of producing the injection conditions that correspond to the conditions that are sought as a function of the type of capsule and/or of the nature of the substance contained in said capsule. It is thus possible to use the same device to produce different beverages, matching up with the specific characteristics of each substance contained in the capsule and with the inherent quality criteria for each beverage.

Additional features and advantages are described herein, and will be apparent from, the following Detailed Description and the figures.

BRIEF DESCRIPTION OF THE FIGURES

FIGS. 1 to 5 show a first embodiment of a device of the invention;

FIG. 1 is a sectional view of the device according to the first embodiment upon opening;

FIG. 2 is a sectional view of the device according to the first embodiment upon closure around the capsule in a first wetting configuration;

FIG. 3 is a sectional view of the device according to the first embodiment upon closure around the capsule in a second wetting configuration;

FIG. 5 is a detail view of the injection system upon its opening, functioning using water pressure;

FIG. 6 is a sectional view of the top of the device according to the second embodiment upon opening;

FIG. 7 is an exploded view of the top of the device of FIG. 6;

FIG. 8 is a sectional view of the device according to the second embodiment upon closure around the capsule in a first wetting configuration;

FIG. 9 is a sectional view of the device according to the second embodiment upon closure around the capsule in a second wetting configuration;

FIG. 10 is a further sectional view on B-B of FIG. 9 of the top of the device only;

FIG. 11 is a further sectional view at a right angle relative to that of FIG. 8 of the top of the device only;

FIG. 12 is a detail view of one of the two perforation and injection elements of the embodiment of FIGS. 6-11;

FIGS. 16 and 17 are diagrammatic views in perspective and in sectional perspective, respectively, of the perforation and injection element that can be used in connection with the embodiment of the preparation device of FIGS. 14-15;

DETAILED DESCRIPTION

Figure 1:
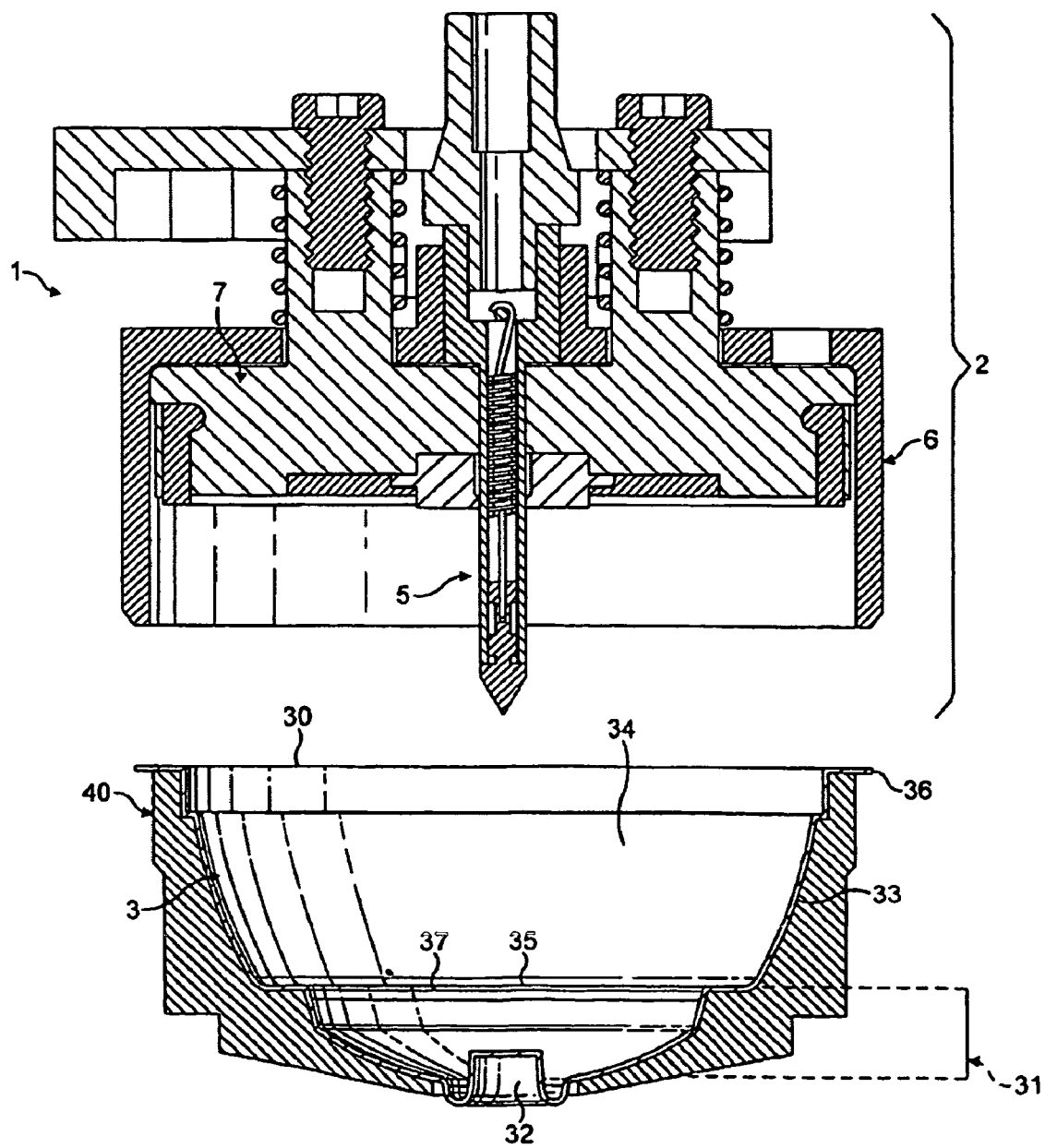

In a preferred embodiment, the injection system comprises at least one perforation and injection element that can be displaced in the capsule into at least two distinct positions, positions that can be defined with reference to the perforated surface of the capsule. The specific displacement of the perforation element is thus a function of the desired wetting mode.

The perforation and injection element may thus be displaced by means of a manually controlled or automatic actuating means of mechanical, hydraulic, electrical or, alternatively, combination type.

In certain embodiments, the perforation element can be displaced in accordance with two different depths in the capsule.

In a first embodiment, the perforation and injection element can be displaced into a first, high position in the capsule for wetting the substance contained in the capsule via the top and a second, deeper or lower position in the capsule for wetting the substance contained in the capsule from the base of the substance. The mode of wetting via the top is well suited to substances to be extracted, as it complies with the requirement that all the solution should pass through the bed, forming a water piston through the bed, which conditions extraction and then the correct instant for the capsule to open.

The mode of wetting via the base, on the other hand, promotes dissolution of substances to be dissolved, such as instant coffee or milk-based beverages, and thus eliminates regions of accumulation of solids, which have a tendency to be created in the bottom of the capsule, such as along the internal ridges or edges.

In a second embodiment, the perforation element can be displaced into a first, high position in the capsule in which at least one injection spike is uncovered in the capsule and a second, lower position in the capsule in which a greater number of injection spikes are uncovered in the capsule. As the number of injection points is increased in the second embodiment, injection becomes more diffuse or more dispersed and the speed of the injection fluid through the capsule is reduced, which better suits substances to be extracted as compared with substances to be mixed.

In a further embodiment, the injection system comprises at least a first perforation and injection element and at least a second perforation and injection element, distinct from the first perforation and injection element, which elements can be displaced relative to one another, each affording a different mode of wetting the substance in the capsule. Thus, each perforation and wetting element specializes in one wetting mode, which is adapted to one or more substances and/or for forming, from one and the same substance, beverages with different characteristics.

In a preferred embodiment, the first and second elements can be displaced in phase opposition (or in movement opposition) relative to one another into at least a first position in which the first element is in engagement in the capsule and the second element is retracted from the capsule and, conversely, a second position in which the first element is retracted from the capsule and the second element is in engagement in the capsule. An arrangement of this type makes it possible rapidly to switch from one wetting mode to another. The advantages are, in particular, speed and simplicity of selection of the appropriate wetting mode.

The opposing movement of the elements may be commanded by a rocker-type or toggle-type command means, for example, or any mechanically or electrically equivalent means, such as a means of the type having a solenoid, for example. The advantage of this is that it allows rapid, reliable selection of the wetting mode that is most suitable as a function of the substance and/or of the capsule present in the device.

An injection element according to the invention may preferably comprise at least one injection point inside the capsule in the form of a jet configured so as to create, in the capsule, a swirling movement that mixes the liquid with the substance.

Preferably, the element may be off-centre relative to the axis of the capsule, in the form of a point, for example, having an injection orifice of which the injection direction is slanted relative to the diametrical axis of the capsule. The axis of the injection orifice from the point of injection forms an angle of between 20° and 60° and preferably between 35° and 45° with a line connecting the point of injection to the centre of the capsule.

A wetting mode of this type has the effect of creating at least one hydraulic force moment that entrains the substance in a rotational movement so as to form a vortex effect inside the capsule, around its central axis. Preferably, the injection direction is towards the bottom of the capsule in order to generate a movement of internal turbulence, not only with a vortex effect, but also in a direction substantially perpendicular to the direction of the vortex, such as from bottom to top.

A single injection spike may be sufficient for substances to be dissolved or dispersed, such as chocolate- and/or milk-based substances.

A number of injection spikes may be arranged off-centre so as better to distribute the liquid in the capsule. A configuration of this type may be advantageous for certain substances, in particular to create a mixing of liquid that is sufficiently distributed in a bed of a substance to be extracted, such as ground coffee or the like.

In a preferred embodiment, one of the two injection elements is a multi-spike plate for perforating, upon its engagement in the capsule, the surface of the capsule at multiple locations. An arrangement of this type is advantageous in the case of ground substances, such as coffee, where it is advantageous to multiply the water-entry regions, to distribute the water over a large part of the capsule cross section, even over its entire cross section, inside the capsule, so as thus to slow the speed at which the water passes through the bed of substance, to thereby prevent preferred routes through the substance and thus to guarantee complete, progressive wetting of all the substance.

In a further preferred embodiment, one of the two elements is an injection spike located substantially in the centre of the capsule and configured so as to produce multidirectional, divergent sprinkling in the form of at least one thin layer of water.

There may be a single layer extending continuously over the periphery of the spike and sprinkling of a substance contained in the capsule circularly, or several discontinuous layers of water extending in a substantially distributed manner over the periphery of the spike. The thin layer or layers of water has or have a thickness that is less than or equal to 0.5 mm, preferably less than 0.3 mm. In a preferred but non-limiting embodiment, the spike is configured so as to open an account of water pressure against an elastic element, so as to free a passage having a thickness that is determined as a function of the pressure and thereby to create the layer of water. A configuration of this type has the advantage of being self-cleaning and of guaranteeing a uniform layer of water, without a problem of obstruction or the like. In another embodiment, the spike comprises fixed openings, in the form of slots, for producing several layers of water, which, in combination with one another, distribute the water and guarantee coverage over approximately 360°.

In another embodiment, the injection spike that produces a divergent sprinkling in the form of one or more thin layers of water may be the only injection means of the device and may be capable of displacement in terms of depth inside the capsule in accordance with at least two different wetting depths. A displacement in accordance with a number of depths makes it possible to process both ground substances arranged as a bed to be extracted, which preferably have to be wetted by means of a full, slow passage of water through the bed, and substances to be dissolved, in which case it may be advantageous to inject the water at a greater depth so as progressively to break up the mass to be dissolved and dislodge it, without forming lumps.

Preferably, an actuating means is provided for displacing said perforation and injection element or elements selectively into the two positions by recognizing the size and/or geometry of the capsule. The actuating means may assume very varied forms without thereby departing from the general principle of the invention. For example, the actuating means may comprise at least one support integral with said perforation and injection element, which support can be displaced elastically relative to a head base, the actuating means comprising at least one detection means for moving the actuating means by complementary engagement of an edge of the capsule. The actuating means may be movable relative to a reference element of the device, such as a head base, which is placed on the injection surface side of the capsule and interacts, in terms of closure, with a capsule support for receiving the capsule and holding it in position.

In a particular embodiment of the invention, the injection system comprises a first injection and perforation element in the form of an off-centre injection spike integral with the actuating means and a second injection and perforation element in the form of a multi-spike plate connected to the actuating means by a rocker-type command means and is mounted so that it can be displaced relative to the head base, said multi-spike plate thus being commanded into a position for perforation of the surface of the capsule when the detection means of the actuating means encounters and engages a complementary edge of the capsule and is commanded into a position of retraction relative to the surface of the capsule, consequently allowing the entry of the injection spike into the capsule when the detection means does not encounter the complementary edge of the capsule.

In a further particular embodiment, the injection system comprises a first perforation and injection element in the form of an off-centre injection spike integral with the actuating means and a second injection and perforation element in the form of a central injection spike mounted as a guide through the actuating means and the head base, said off-centre injection spike being in a position in which it is retracted from the surface of the capsule when the detection means of the actuating means encounters and engages a complementary edge of the capsule and is in a perforation position in the capsule when the detection means does not encounter the complementary edge of the capsule.

According to another characteristic, the injection system of the device of the invention comprises means for keeping the water at a certain injection temperature depending on the nature of the substance and/or of the injection type. Means of this type may comprise a water heater such as a thermal unit, a heating resistive cartridge or, alternatively, a kettle, and means for monitoring the temperature of the water in the injection system such as a thermostat, for example. The means for maintaining water temperature are switchable in order to heat the water in accordance with a first range of temperatures and in accordance with a second range of temperatures that is different from the first range of temperatures, and vice versa, this being as a function of the nature of the substance and/or of the type of capsule. Thus, when the capsule contains a product that might produce froth, such as milk, the injection system is switchable in order to establish the temperature of the water upon injection within a temperature range that does not affect frothing of the substance. For example, in the case of powdered milk, the temperature is thus lowered to a temperature range below 80° C., preferably between 50 and 75° C. Switching may be effected by the actuating means linked to the capsule, as described previously.

Similarly, the water-injection system has means for regulating the water flow rate as a function of the nature of the substance and/or of the type of capsule. In a preferred manner, the means comprise a pump, the force of which can be regulated and regulation of which may be effected by the actuating means in connection with the capsule, as described previously.

The invention also relates to a method for preparing a beverage by injection of water through a capsule containing a substance to be dissolved and/or to be extracted, in which the liquid is injected through the capsule in accordance with at least two different injection modes, it being possible for each to be selected as a function of the type of capsule and/or the nature of the substance contained in said capsule.

In a further embodiment, the liquid is injected in accordance with at least two modes in which the injection point or points is or are spatially distinct and/or differs or differ in terms of number.

For example, the liquid is injected in accordance with two injection modes that define two distinct injection depths in the capsule.

In a further embodiment, the liquid is injected in accordance with at least two modes in which the injection point or points is or are spatially distinct and/or differs or differ in terms of number.

For example, the liquid is injected in accordance with two injection modes that define two distinct injection flow depths in the capsule.

According to a further variant, the liquid is injected in accordance with at least two injection modes in which the speed of introduction of the liquid into the capsule is different. More particularly, the speed of introduction of the liquid into the capsule may be slowed by multiplying the points of injection of the liquid into the capsule from one and the same pressurized-liquid source. In the case of substances to be extracted, it is advantageous to have a slower introduction speed than in the case of soluble or dispersible substances to be mixed. Thus, in the case of a substance to be extracted, a multitude of injection points is preferable, allowing the introduction of liquid at a speed that is relatively lower in order to prevent the formation of preferred routes through the bed of substance.

For example, the liquid is injected in accordance with a first mode so as to create, in said capsule, a swirling movement of the injected liquid, giving rise to mixing with said substance.

Similarly, the liquid is injected in accordance with a second mode so as to form a sprinkling from several entrance points into the capsule at an injection speed that is slower than in the first mode.

Figure 2:
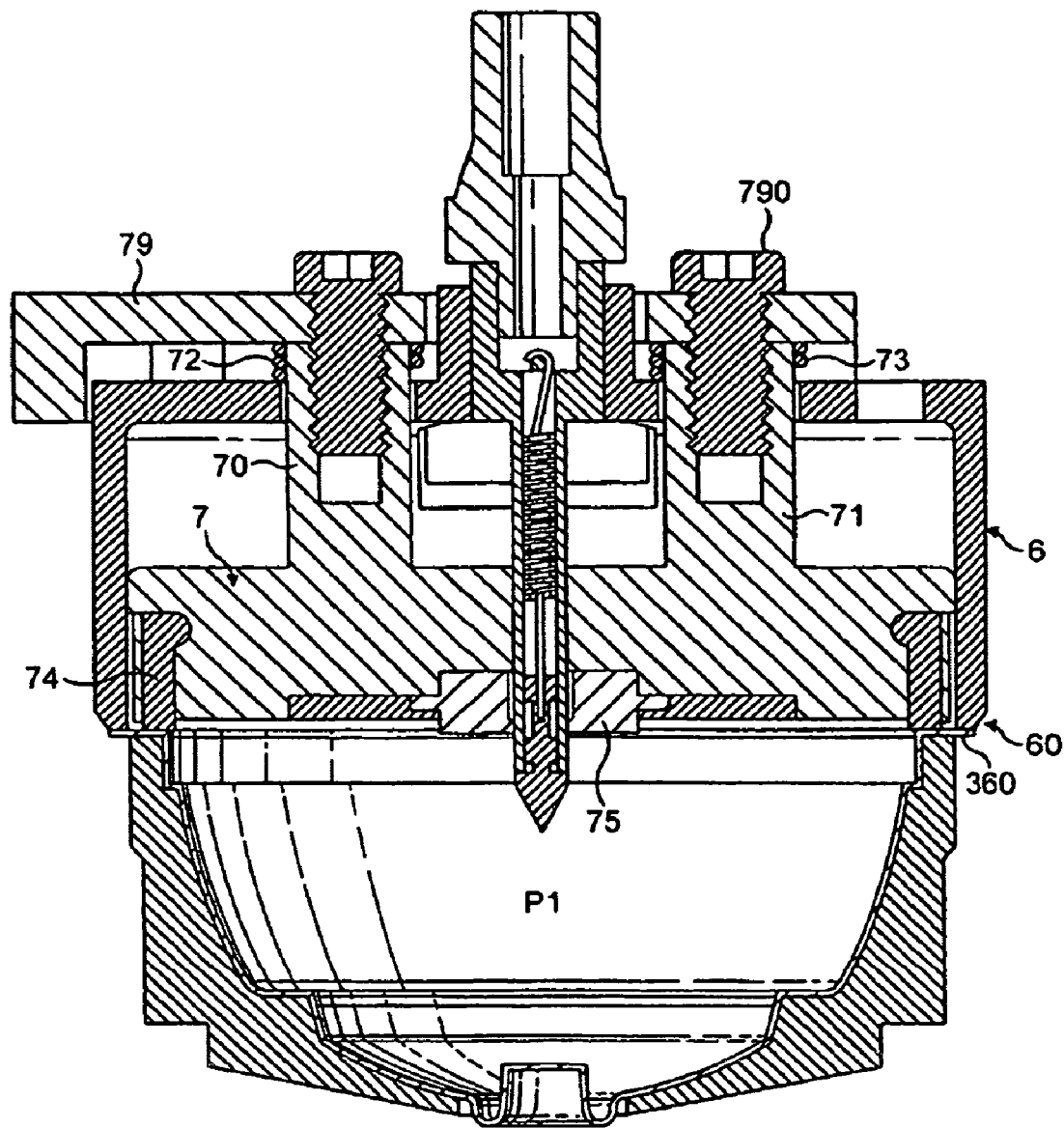
Figure 3:
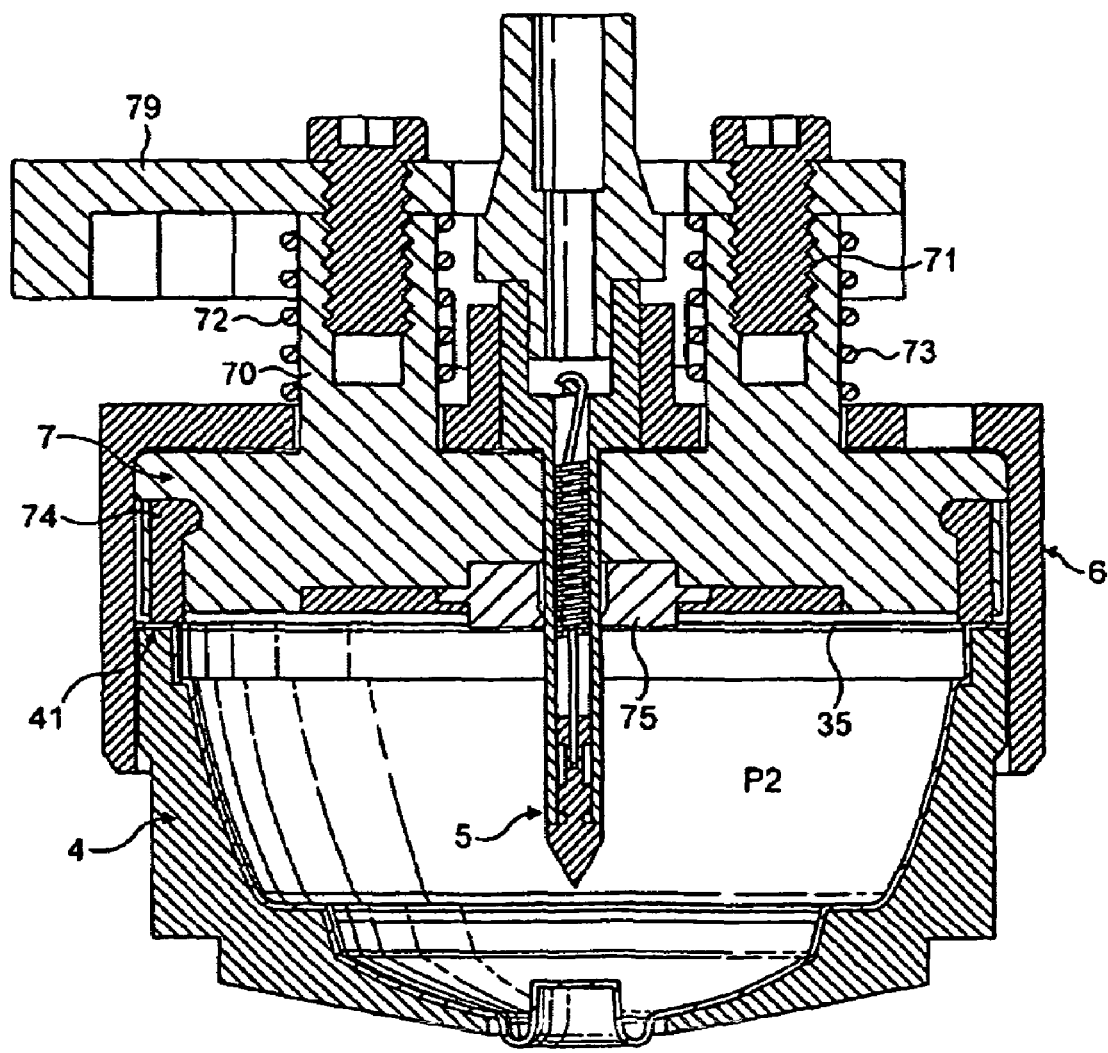

With reference to FIGS. 1 to 3, a first preferred embodiment of a preparation device 1 is illustrated in section and comprises a system 2 for injecting a pressurized fluid, preferably cold or hot pressurized water, which system is switchable in accordance with at least two different injection-depth positions inside a capsule 3. The device comprises a first, lower subassembly in the form of a capsule support or "capsule holder" 40 that has a form and a size that is adapted to receive, partially, at least the capsule 3. The capsule may be a closed, open or partially open capsule.

According to a preferred embodiment, the capsule comprises a closed chamber containing the substance to be extracted and/or to be dissolved, and a retention portion, such as a membrane 35, that opens, through the effect of the rise in pressure inside the chamber, in contact with engagement means such as relief-type elements 37. The engagement means may either form part of the capsule itself or form part of the capsule holder 40. The capsule may also preferably comprise means 31 for collecting the liquid extracted or the mixture, and a conduit means or flow orifice 32, both of which belong to it. This has the advantage, in combination with the integral opening means, of delivering a product without direct contact with the device, in particular with the capsule support 40. This guarantees an absence of cross-contamination of beverages, better hygiene, less cleaning and greater simplicity in the actual design of the preparation device. More precisely, the capsule may comprise a dish 33, made from plastic or the like, for forming or housing the functional elements, namely the relief-type elements, the sealed opening membrane 30 and the conduit means 32. The dish 33 may be closed, in order to form the chamber 34, by means of a second entry membrane 30 sealed over the sealing edges 36 of the capsule. The configuration of the capsule may, of course, have many other designs and/or forms without thereby departing from the context of the invention. For example, the capsule could comprise a body formed largely from a flexible material (sachet) that is inserted in the device in an equivalent manner.

A preferred capsule is described in greater detail in patent application Euro-PCT No 03/00384, filed on 13 Jan. 2003, the entire content of the latter being added to the present application here by means of the present reference.

The device comprises a second subassembly or injection system 2 that interacts upon closure with the capsule holder 40 in order to define an injection chamber enclosing the capsule. In this first embodiment, the second subassembly or injection system 2 is formed from a central perforation and injection element 5, the constructional details of which will be given below, and an actuating means 6 that is integral with the element 5 in such a manner as to displace the actual injection point inside the capsule in accordance with a number of wetting modes. To that end, the perforation and injection element passes through a head base 7, which is displaced upon closure relative to the capsule support 40. It is understood that the head base may be movable relative to a fixed support 40, or vice versa, or, alternatively, both may be movable upon closure. Mounted on the head base 7 is the actuating means in the form of a movable support in the form of a bell-shaped part that is called "movable bell-shaped part 6" in the remainder of the description.

The movable bell-shaped part 6 is associated in terms of elastic guiding in translation relative to the head base 7 by means of a number of guide tubes 70, 71 of the head base and of springs 72, 73 inserted between the upper end wall 79 of the head base and the movable bell-shaped part 6, such that, in the open position of the device, the head base 7 is applied substantially in the bottom of the movable bell-shaped part through the effect of the compression of the springs. To that end, the upper end wall 79 is connected securely to the tubes of the head base by any appropriate connection means, such as screws 790.

The head base 7 also comprises peripheral sealing means 74, such as an elastomer seal, arranged in order to bear, upon closure, against the peripheral edges 41 of the capsule holder 40. The head base thus comprises a part that is applied close to the entry surface of the capsule at the time of closure. This allows the introduction of the central perforation and injection element 5 through the capsule, more precisely through the entry membrane 30 of the capsule. A supplementary sealing element 75 may also surround the perforation and injection element in order to prevent a rise of fluid through the injection system and out of the device.

The embodiment of the invention shown is based on the principle that the actuating means of the injection element or movable bell-shaped part 6 being integral with the element 5 makes it possible, depending on its relative position in relation to the capsule support, to modify the position of the perforation and injection element in the capsule and thus to change the wetting configuration of the substance contained in the closed chamber of the capsule. More precisely, the movable bell-shaped part 6 has means for detection depending on the actual type of capsule that are formed by the engagement edges 60 that are capable of engaging complementary edges 360 of the capsule and thus, consequently, that are capable of pushing back the bell-shaped part 6 relative to the head base 7 in direction A as a function of the width of the edges of the capsule (as shown in FIG. 2). The introduction position of the perforation element can thus adopt two distinct positions depending on whether the capsule has wide edges or edge extensions 360*b* that engage against the edges 60 of the bell-shaped part 6 or, alternatively, a narrow configuration of edges 360*a*, which the edges of the bell-shaped part do not then encounter.

Thus, FIG. 2 shows a configuration in which the capsule has extensions or wide edges 360 to make it possible to push back the bell-shaped part 6 and thus to halt the perforation and injection element in an introduction position PI close to the entry of the capsule. Such a position makes it possible to inject the fluid substantially at the level of the entrance of the bed of substance, which is well suited to ground products to be extracted, for example.

FIG. 3 shows a configuration in which the capsule has narrower edges 360*a* that allow the bell-shaped part 6 to pass along the capsule support upon closure of the device without pushing it back. In this case, the perforation and injection element is able to reach a position P2 that is deeper inside the capsule. Such a position proves advantageous for wetting the substance via its base, thereby giving rise to a progressive breaking-up of the mass of substance. In the case of soluble substances, for example, a wetting mode of this type proves particularly effective.

Figure 4A:
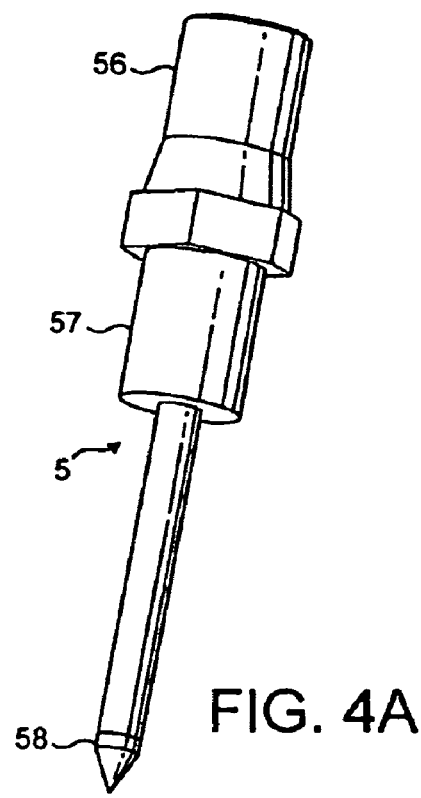
FIG. 4A is a perspective view of the injection system of the first embodiment.
Figure 4B:
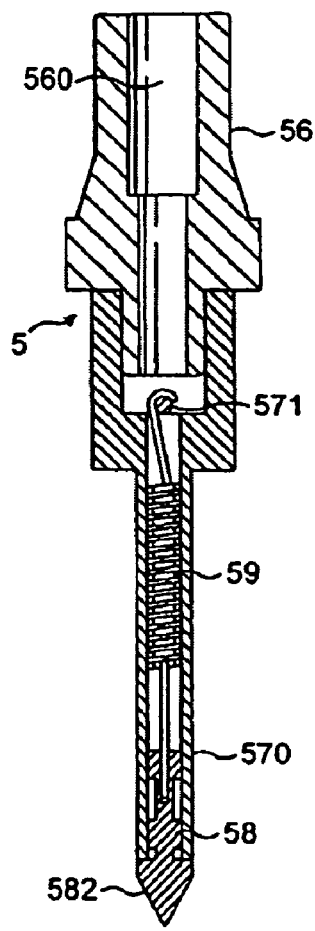
FIG. 4B is a sectional view on A-A of FIG. 4A.
Figure 5:
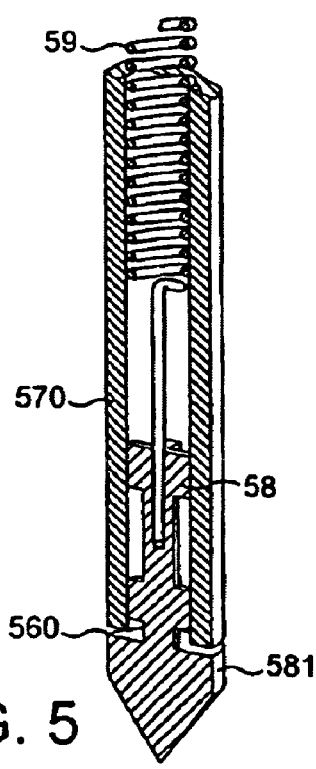
Figure 6:
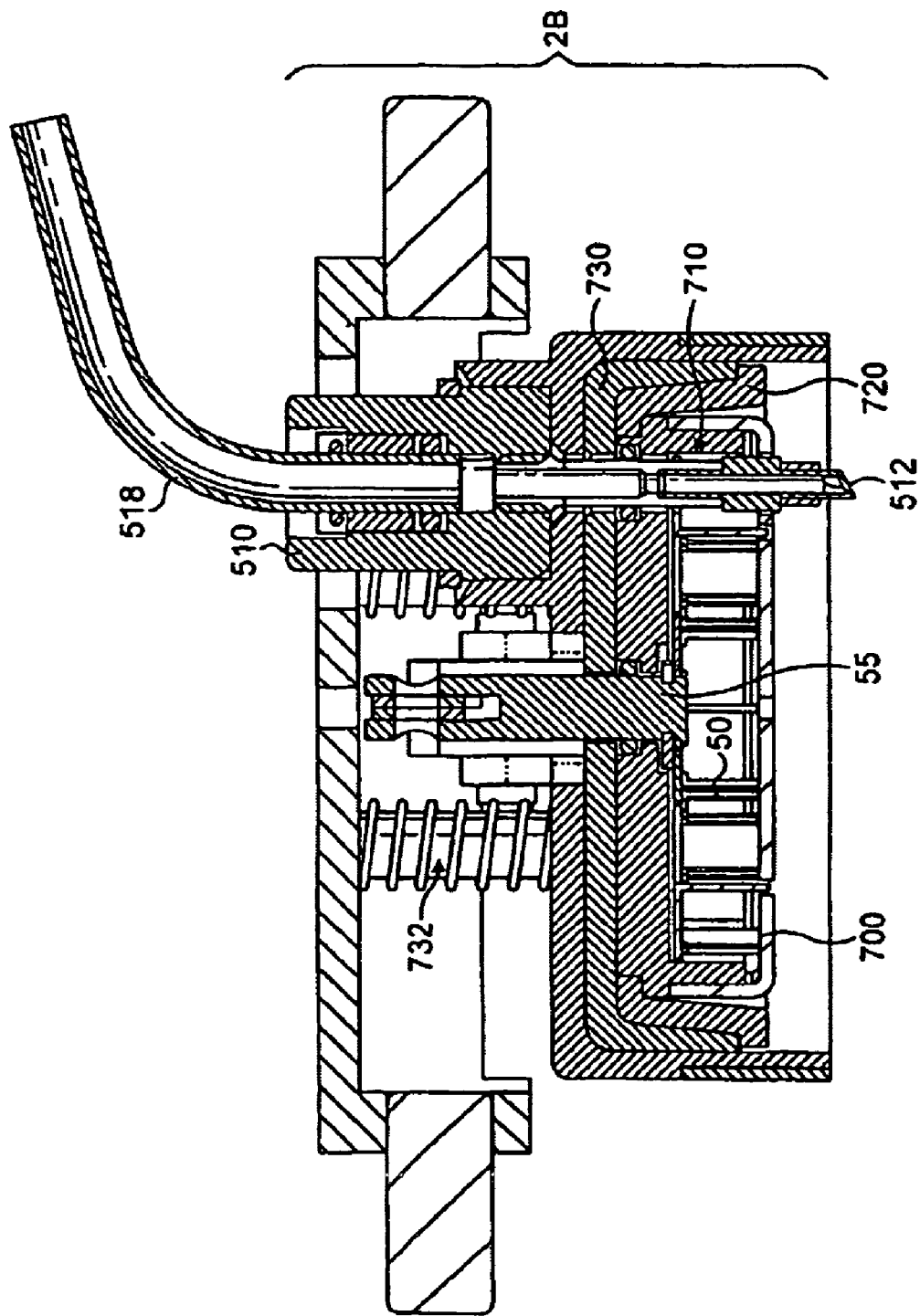
FIGS. 6 to 12 show a second embodiment of the device according to the invention.

FIGS. 4A, 4B and 5 show in detail a preferred configuration of the perforation and injection element 5. The perforation and injection element 5 has an end piece 56 that can be connected to the pressurized-fluid supply of the preparation device. The end piece comprises a hollow through-bore 560 for conveying the fluid and is connected directly at its lower end to an elongate hollow injection portion 57. The hollow portion 57 ends in an open tube 570 that is closed off, in a controlled manner, by a central needle 58 through the action of a draw spring 59 housed in the hollow portion and attached to a fixed point 571 of the hollow portion. The central needle 58 has internal wings that enable the central needle to be slid in the tube portion in a centered manner and without jamming, while leaving passages for the fluid. The needle has a closure surface 582 on which the pressurized fluid acts in order to push the needle back and to release an opening or passage 560 of circular shape and controlled thickness (FIG. 5). The thickness is controlled by the force chosen for the spring 59. Thus, it is preferable for the opening to have a thickness that is at most equal to 2 mm, preferably less than 1 mm, even more preferably less than or equal to 0.5 mm. The small thickness of the opening has the effect of producing a sprinkling layer covering a significant surface area of the substance but also having sufficient velocity in order to form a jet effect through the substance.

The embodiment of FIGS. 6 to 13 is a variant of a device of the invention in which the injection system 2B in particular differs substantially from that previously described, whereas the other means of the device may remain identical or similar. This embodiment differs from the preceding one principally in that it comprises two distinct perforation and injection elements that can be displaced relative to one another in order to achieve at least two different wetting modes for the substance in the capsule.

Figure 7:
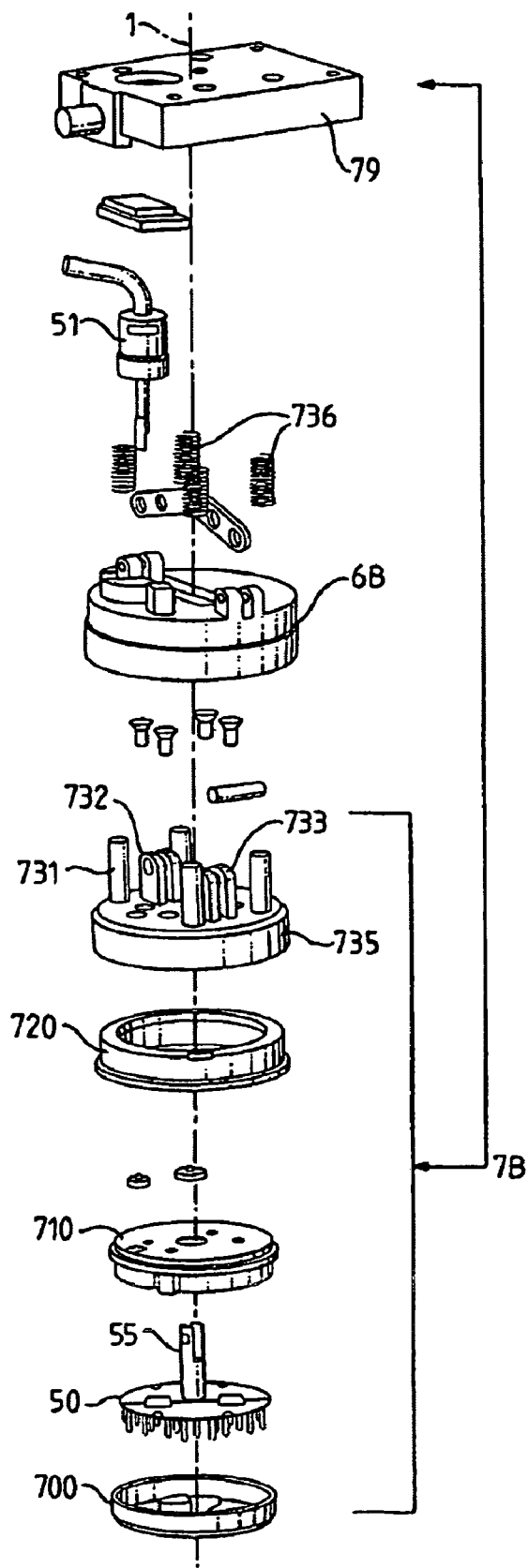

The detail of the injection system is described here in connection with FIG. 7. A first perforation and injection element can be seen in FIG. 7 in the form of a multi-spike plate 50 that can move in movement opposition relative to a second perforation and injection element in the form of an off-centre spike 51 mounted securely on the actuating means, known as "movable bell-shaped part 6B".

Figure 9:
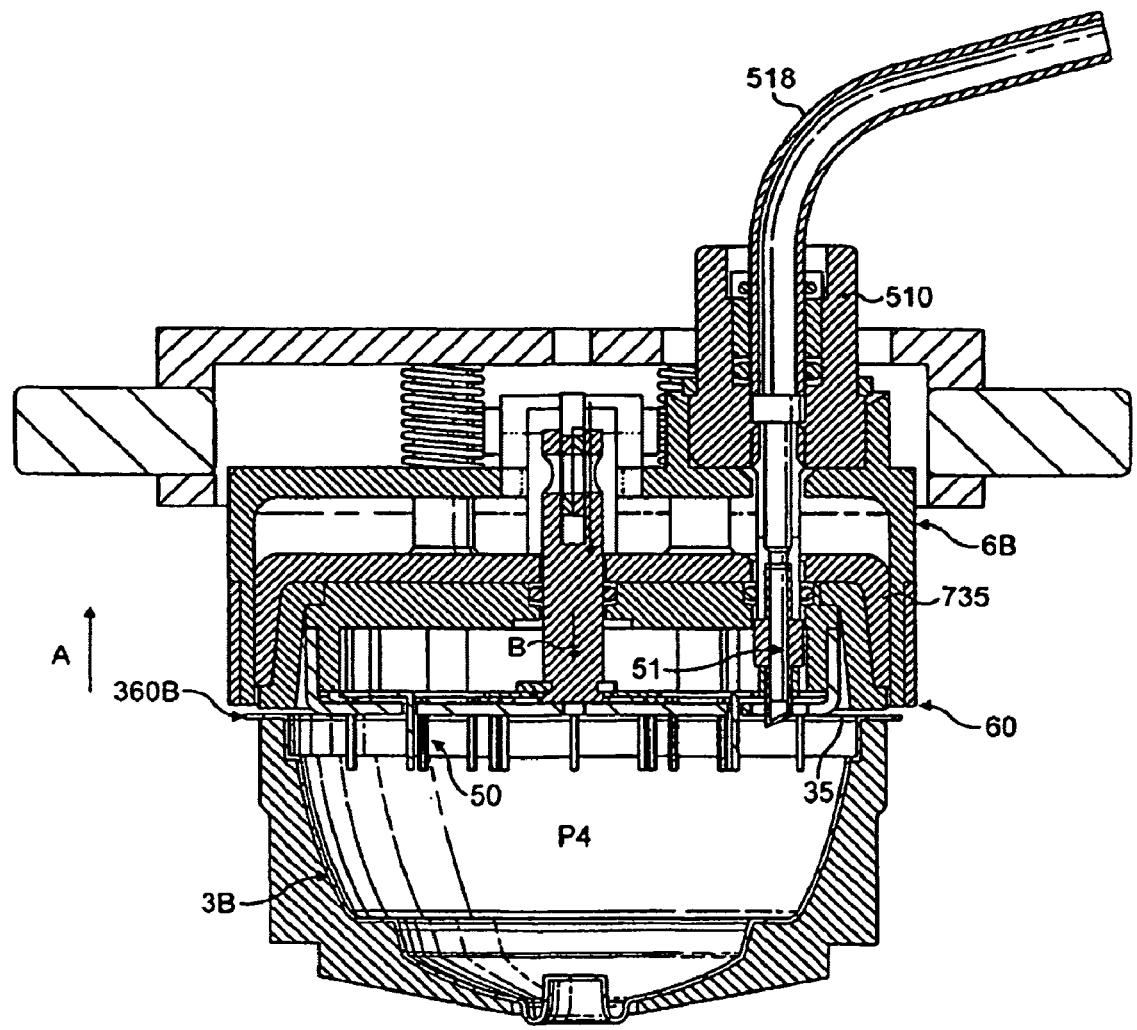

The multi-spike plate 50 has a multitude of piercing elements for perforating the entry surface 30 of the capsule and allowing the entry of the fluid through the multiple holes thus created (FIG. 9). The plate is mounted on a head base 7B that comprises, inter alia, a pressure distribution grid 700 and an inner cap 710 that can be connected to the grid by snap-fitting or any equivalent means. The pressure distribution grid is used in particular to keep the surface of the capsule out of contact with the spikes if the other wetting mode is selected and the capsule is placed under liquid pressure.

A peripheral seal 720 in the form of a ring is provided in order to surround the cap 710 and thus define an inner chamber 730 for filling with pressurized fluid and thus allowing the isobaric distribution of the fluid through the multi-spike plate and the grid. The head base also comprises a fixed bell-shaped part 735 connected over the elements 700, 710, 720, forming the link by elastic guiding with the movable bell-shaped part 6. In order to do this, the fixed bell-shaped part 735 comprises guide tubes 731 via which the movable bell-shaped part 6B is able to slide by gliding. The guide tubes are connected to the upper end wall 79 of the head base by screws or any other equivalent connection means. Springs 736 are arranged between the movable bell-shaped part 6 and the end wall 79, along the tubes 732, so as to generate an elastic force necessary for elastically countering the displacement of the movable bell-shaped part 6 relative to the fixed bell-shaped part 735.

Figure 13:
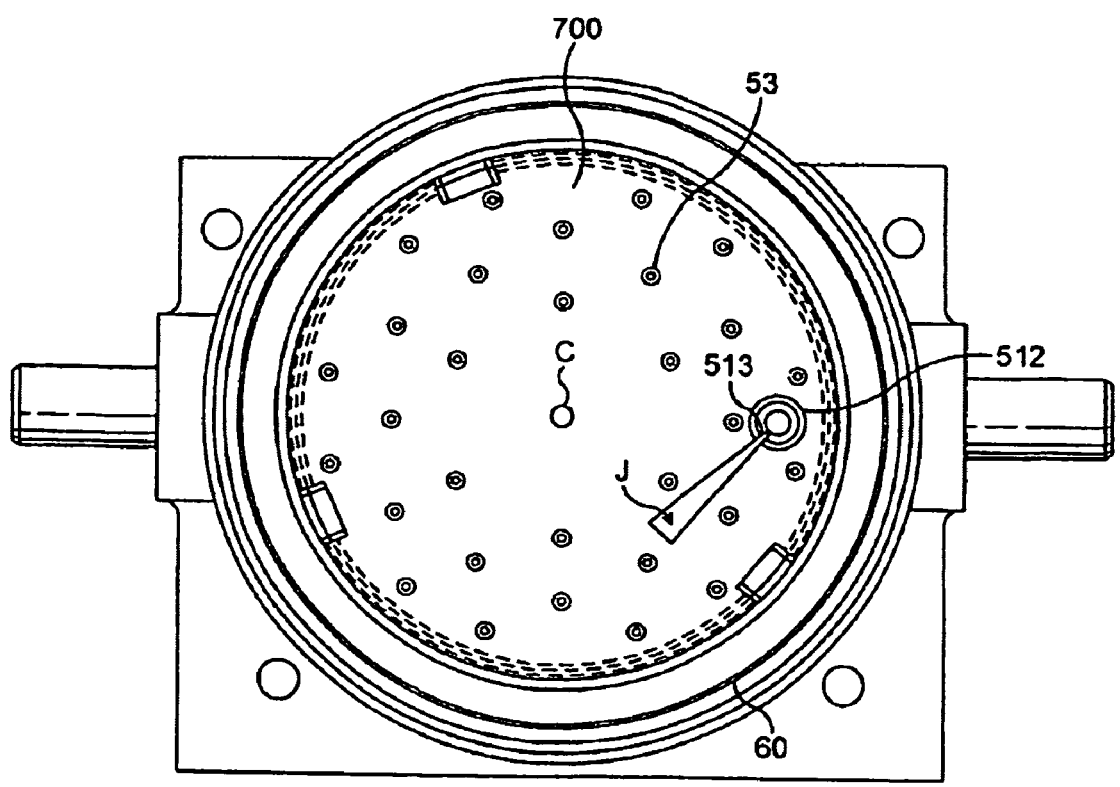
FIG. 13 is a simplified bottom view showing the injection configuration of the other perforation and injection element of the embodiment of FIGS. 6-12.

The movable bell-shaped part 6B supports the injection spike 51, which is arranged off-centre relative to the central axis I of the injection system, coinciding with the axis of the capsule. The spike may be connected by means of a sleeve 510 screwed into a housing of the bell-shaped part 6B and extending through the head base via a hollow needle 512 comprising a beveled part ending in an injection opening 513. The injection opening 513 is directed in such a manner that it produces a swirling fluid movement or "vortex" inside the capsule when this injection mode is actuated. This mixes the liquid with the substance contained in the capsule. To that end, the injection direction is inclined relative to the diametrical axis of the capsule and, moreover, is preferably inclined downwards, as shown in FIG. 13.

The injection elements 50, 51 are arranged relative to one another so as to be actuated alternately inside the capsule. More precisely, the multi-spike plate is articulated to the head base 7B on the one hand and to the movable bell-shaped part 6B on the other by means of a rocker-type command system. To that end, the multi-spike plate is extended via a rod 55 through the head base 7 and is connected to the first ends of two levers 80, 81 by a central, common articulation 734. The levers 80, 81 are themselves connected at their centre on articulations 738, 739 of the head base and their second ends are connected to articulations 600, 601 of the movable bell-shaped part 6B. The articulations may be formed by simple rotational pins or pins combining rotation and translation, such as articulations of oblong type, so as to facilitate the movements and to prevent jamming.

The way in which the injection system operates may now be explained in detail in connection with FIGS. 8, 9, 10 and 11.

Figure 8:
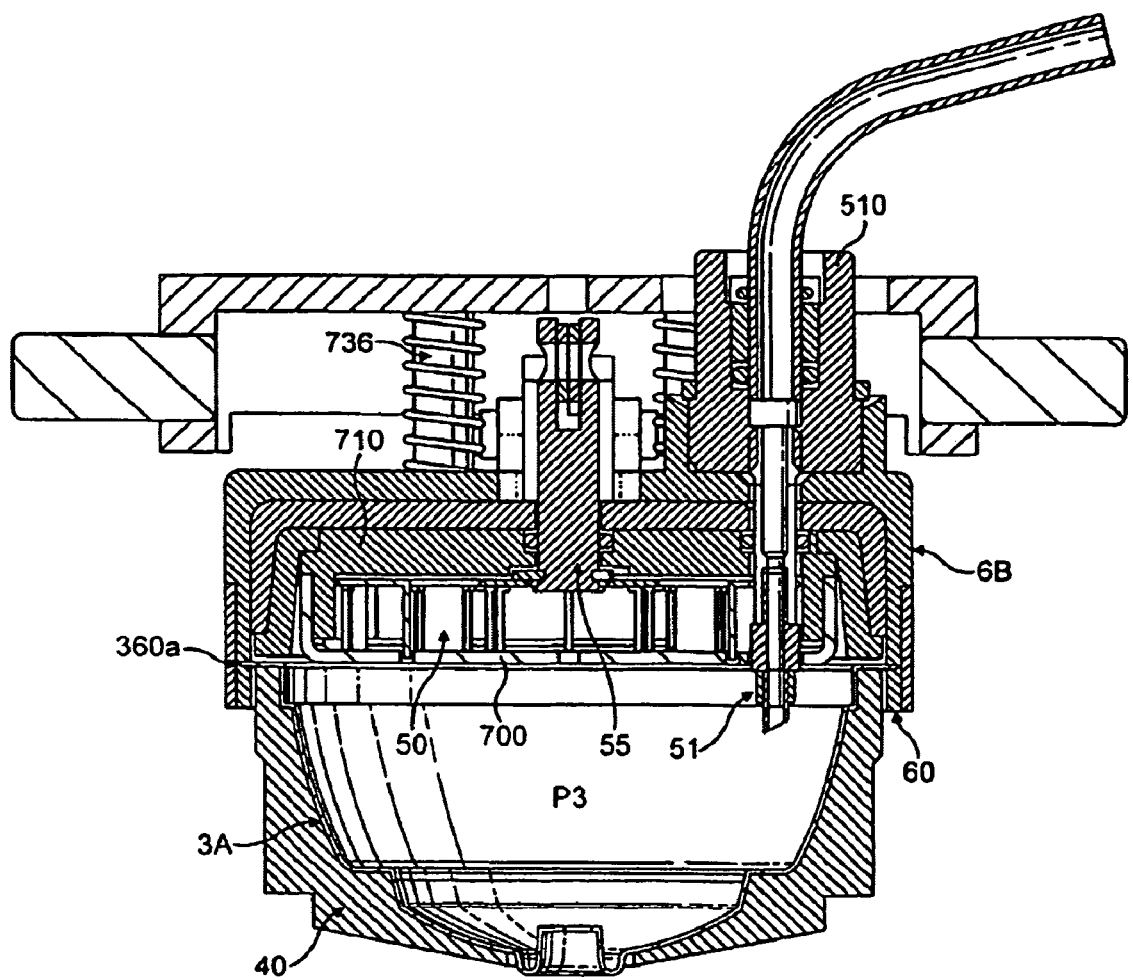

When a capsule 3A with narrow edges 360*a* is introduced into the capsule support and the device is closed, as shown in FIG. 8, the engagement edges 60 do not then detect a complementary capsule edge. This means that the movable bell-shaped part is not pushed back upwards and thus covers the support partially. In this configuration, the off-centre injection spike 51 is thus entrained integrally with the movable bell-shaped part and adopts an injection position P3 inside the capsule. The head base then continues to bear internally inside the movable bell-shaped part through the effect of the springs 736, which maintain the elastic cohesion of these two elements. The multi-spike plate 55 is then held in a retracted position relative to the surface of the distribution grid 700 and thus also relative to the surface of the capsule (FIG. 8). The off-centre injection spike is therefore the only element in engagement in the capsule. This position thus corresponds to that shown in FIG. 13, in which, upon introduction of the pressurized fluid inside the capsule through the only injection spike, a swirling effect or vortex is created by the particular direction of the fluid in the capsule.

Figure 10:
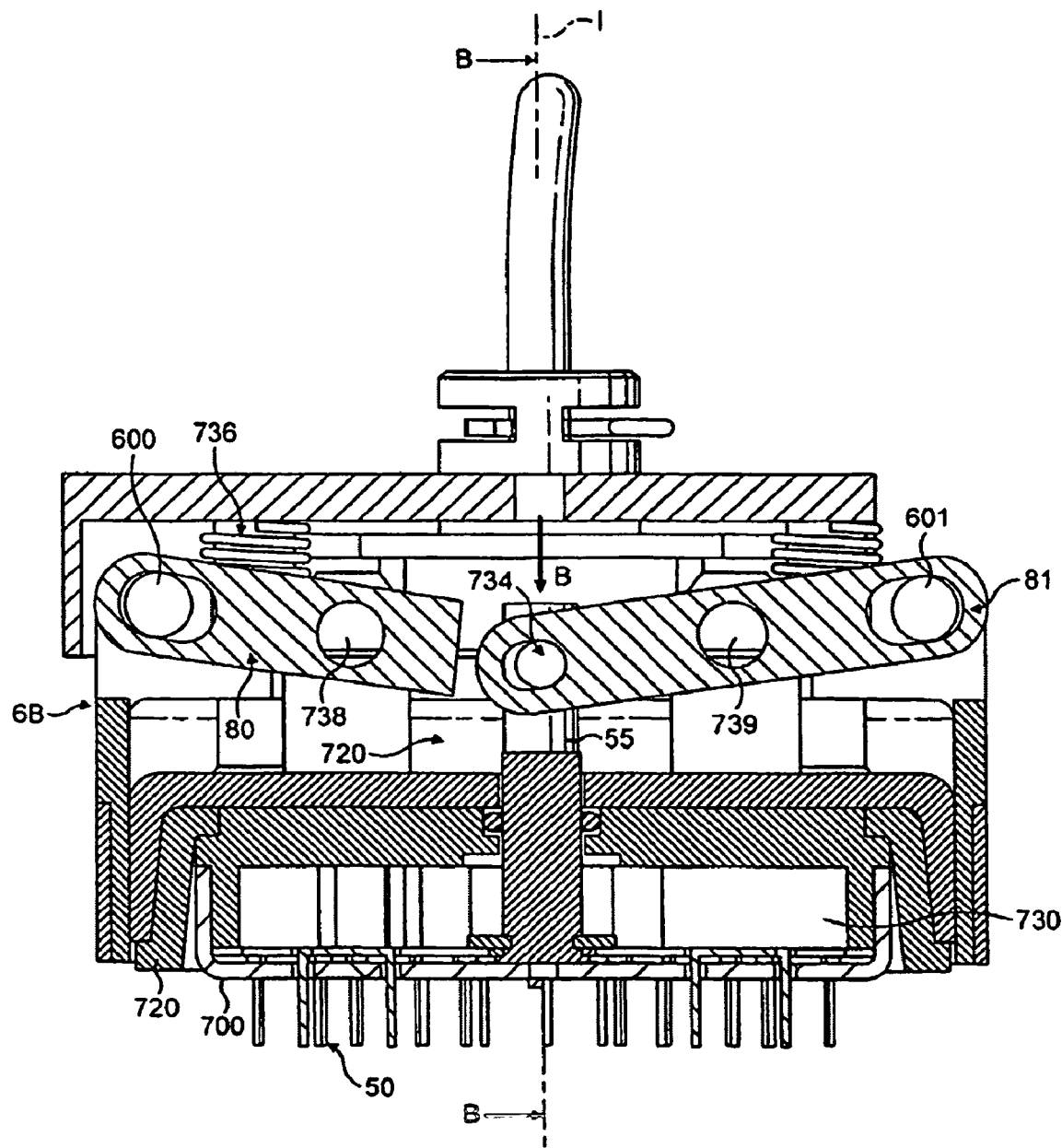
Figure 11:
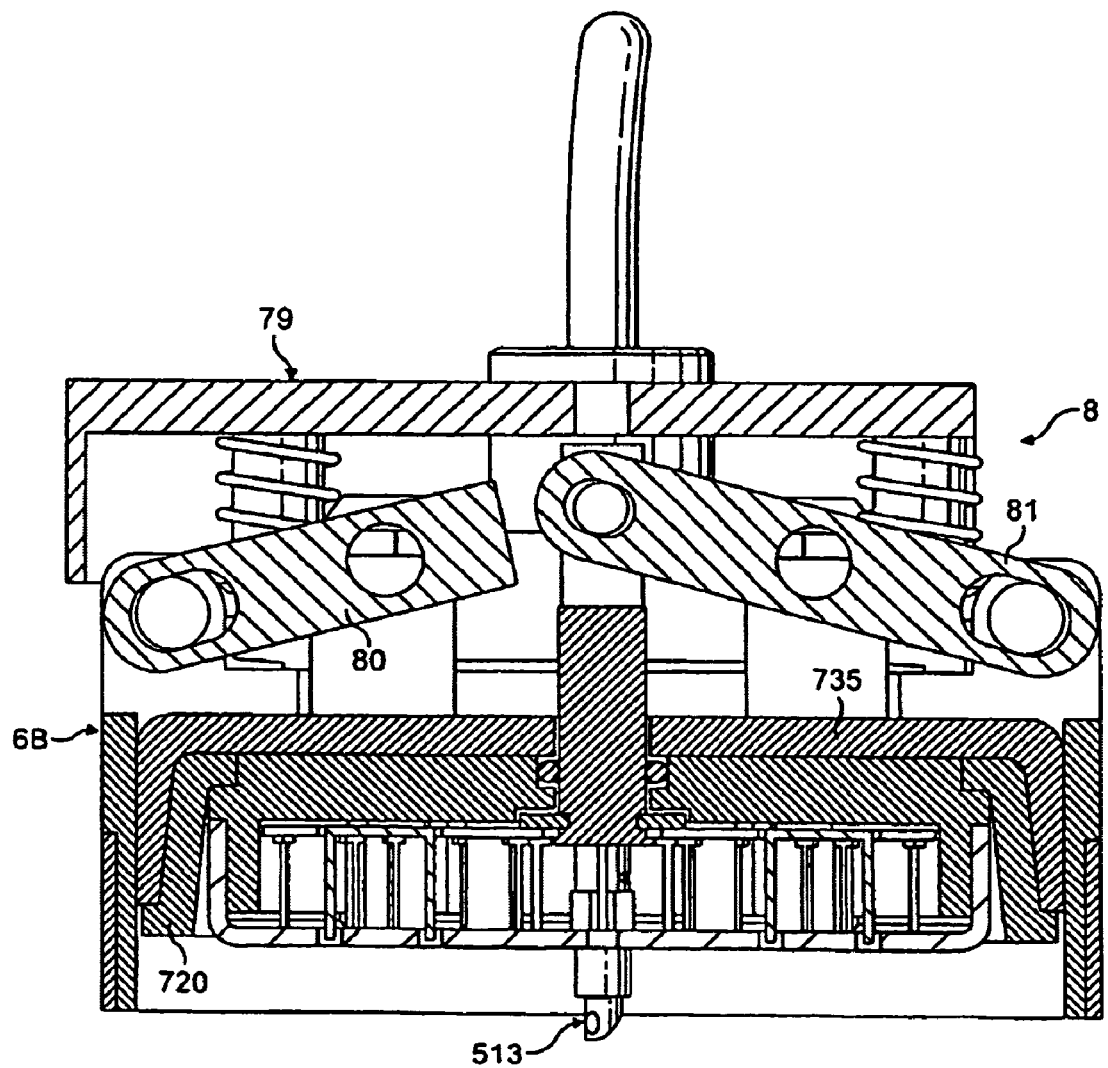

When a capsule 3B with edge extension is introduced into the device and the device is closed, as shown in FIGS. 9 and 10, the engagement edges 60 of the movable bell-shaped part then enter into contact with the edges 360*b* of the capsule. This contact has the effect of pushing the movable bell-shaped part back in direction A, which movement then actuates the rocker-type means 8 (levers 80, 81) in order to force the multi-spike plate in the opposite direction B. The multi-spike plate then adopts the injection position P4 in the capsule. The off-centre injection spike 51, itself integral with the movable bell-shaped part, then remains in a retracted position relative to the surface of the capsule.

Water is injected via the injection spike that supplies fluid to the chamber and then through the multi-spike plate, from a supply 518 such as a water inlet hose connected upstream to a pump.

An embodiment of this type has the advantage of using a single water-supply source for two separate elements that can be switched in movement opposition.

Figure 12:
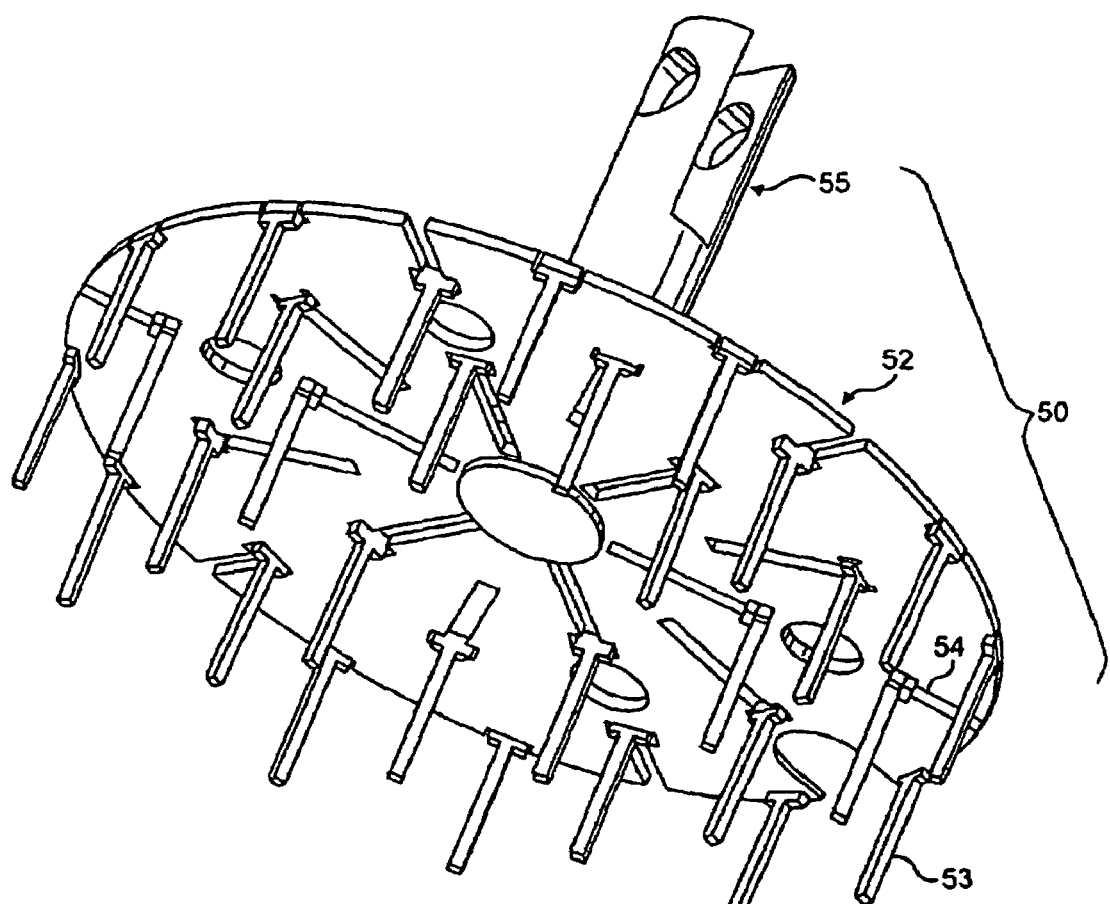

FIG. 12 shows a detail view of a preferred embodiment of the multi-spike plate 50. The plate may comprise a metal plate portion 52 in which a multitude of individual strips 53 that are sufficiently fine, but rigid, to provide effective, reproducible piercing through the surface of the capsule over a large number of cycles, are cut and folded. The right-angled folding of each strip makes it possible to define an aperture 54 for the passage of the water from the chamber through the plate portion 52. Additional openings may be added if necessary.

In FIG. 13, the preparation device is shown in a wetting mode in which the liquid is injected into the capsule so as to create a swirling movement of the liquid around the centre of the capsule accompanied, in particular, by multiple instances of the jet bouncing off the inner walls of the capsule. It may be seen that the perforation and injection element 512, more precisely the injection orifice 513, is arranged at a distance from the centre of the capsule (embodied by point C on the inner surface 700 of the system) and is thus off-centre relative to the vertical axis of the capsule. The direction of the injection jet J thus created is therefore oriented on the one hand on an axis passing out of the way of the centre C and on the other hand on a second axis oriented towards the bottom of the capsule. This configuration of the position of the injection orifice 513 in the capsule and the particular orientation of the injection direction J produces a swirling movement around the centre of the capsule accompanied by multiple instances of the jet bouncing off the inner walls of the capsule. The general movement thus produced makes it possible to obtain efficient mixing of the liquid with the substance contained in the capsule and to achieve complete dissolution or wetting of the substance.

Figure 14:
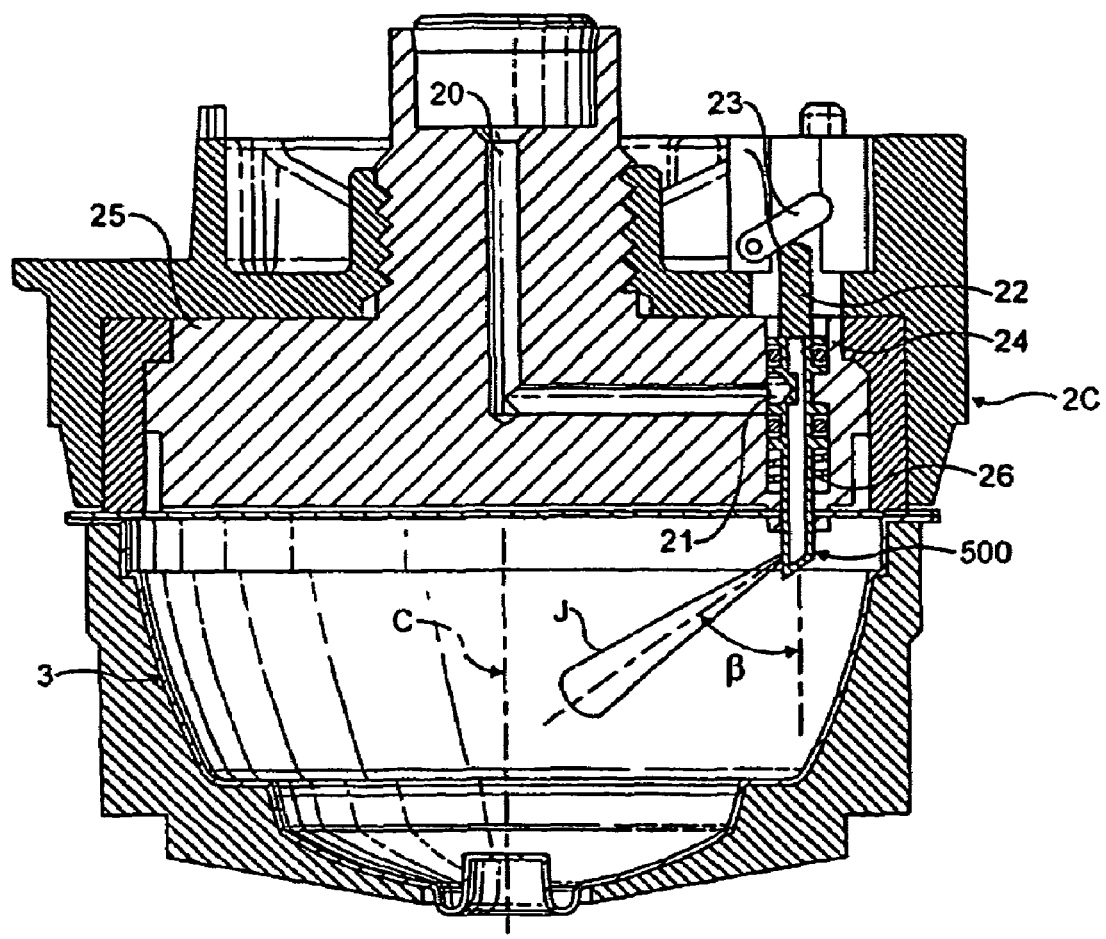
FIG. 14 is a diagrammatic view in section of a further embodiment of a device for preparing a beverage by injection of a liquid through a capsule according to the invention, the preparation device being represented in the closed position and according to a first mode of use.
Figure 15:
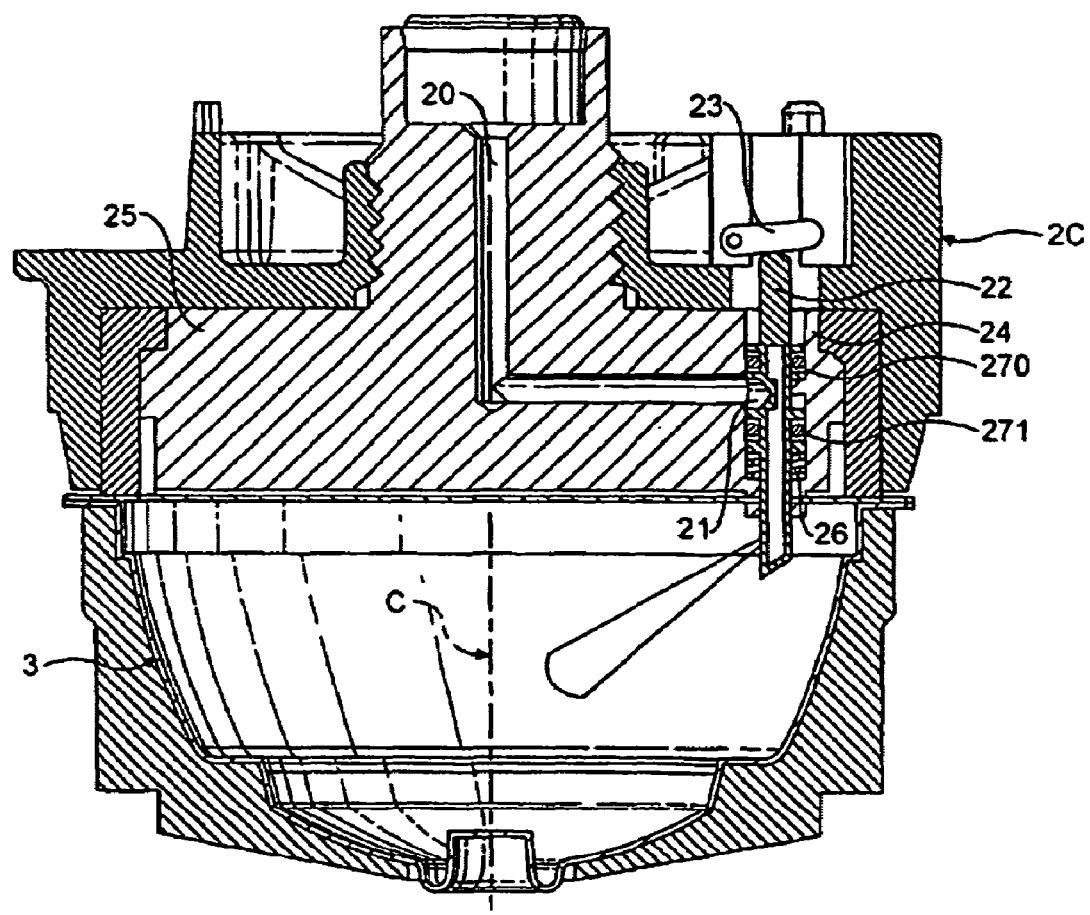
FIG. 15 is a diagrammatic view of the preparation device shown in FIG. 14, the preparation device being shown in the closed position and according to a second mode of use.

FIGS. 14 and 15 show a further embodiment of a device for preparing a beverage by injection of a liquid through a capsule according to the invention. The preparation device is shown in the closed position in these two figures, but according to a first wetting mode in FIG. 14 and according to a second wetting mode in FIG. 15. "Wetting mode" is understood within the context of the present invention to be the type of wetting of the substance contained in the capsule 2 that it is desired to obtain, the type of wetting depending essentially on the nature of said substance.

In FIG. 14, the preparation device is shown in a first wetting mode in which the liquid is injected into the capsule so as to create a swirling movement of the liquid around the centre C of the capsule accompanied, in particular, with multiple instances of the jet bouncing off the inner walls of the capsule, as described above in connection with FIGS. 1 and 2. This mode of wetting is particularly well suited to capsules containing soluble substances, as it allows complete, rapid dissolution of this type of substance.

In FIG. 15, the preparation device is shown in a second mode of wetting in which the liquid is injected into the capsule so as to create, in addition to a swirling movement of the liquid around the centre C of the capsule, wetting in the upper part of the capsule with the aid of a divergent jet of liquid in the form of a thin layer of liquid for wetting the top of the substance contained in the capsule. This mode of wetting is particularly well suited for capsules containing substances to be extracted, as it allows complete, rapid dissolution of this type of substance.

According to this second embodiment of the invention, the preparation device comprises a perforation and injection element 500 comprising a first injection orifice 513 arranged and oriented in an identical manner to the injection orifice 513 of the perforation and injection element described in connection with FIGS. 8-11, and a second injection means 515, the injection axis of which extends substantially horizontally in order to produce the divergent jet in the form of a thin layer of liquid. With reference, also, to FIGS. 16 and 17, it will be seen that, in the example illustrated, the perforation and injection element 500 has the form of a hollow needle that includes a channel 513*a* opening outwards at a first end via first 513 and second 515 injection means. The channel 513*a* also communicates with the supply channel 20 in its median part, via an opening 21. The perforation and injection element is extended at the end opposite the injection means 513 and 515 by an actuating finger 22 interacting with a lever 23 commanded by switching means (not shown) integral with the head 2C. The perforation and injection element 500 comprises, in its median part, a portion of larger diameter in which the opening 21 is made and via which it is mounted movably in translation in a shouldered passage 24 extending parallel to the vertical axis of the injection head made in the core 25, a return spring 26 being interposed between the bottom of the passage and a shoulder of the perforation and injection element 500. Two 0-ring seals 270, 271 are placed on either side of the opening 21 on the perforation and injection element 500 in order to interact with the inner surface of the passage 24.

In this embodiment, the perforation element 500 is movable between two distinct positions, namely a first position (FIG. 14) in which only the first orifice 513 opens out inside the capsule 3, this corresponding to the first mode of wetting, and a second position (FIG. 15) in which the first orifice 513 and also the second injection means 515 open out inside the capsule 3, this corresponding to the second mode of wetting. The changeover from the first mode of wetting to the second mode of wetting is achieved via switching means acting on the perforation and injection element 500 against the return spring 26 via the lever 23. It is well understood that the diameter of the supply channel 20 and of the opening 21 and also the path of the perforation and injection element for the changeover from the first to the second mode of wetting 515 are arranged such that the opening 21 always communicates at least partially with the supply channel 20 irrespective of the mode of wetting selected.

Preferably, and as emerges from FIGS. 16 and 17, the second injection means 515 that makes it possible to produce a divergent jet in the form of a thin layer of liquid comprises a plurality of orifices 515a distributed over a portion of the periphery of the perforation and injection element 500. As the perforation and injection element 500 is arranged off-centre inside the capsule and, more precisely, in the vicinity of the lateral wall of the capsule, the orifices 515a are directed towards the centre of the capsule. For reasons linked to the manufacture of the element 500, the orifices 515a are advantageously offset in terms of height relative to one another. These orifices 515a thus produce a plurality of divergent jets that overlap in order to form a thin layer of liquid that sprinkles and wets the substance contained in the upper part of the capsule.

Figure 18:
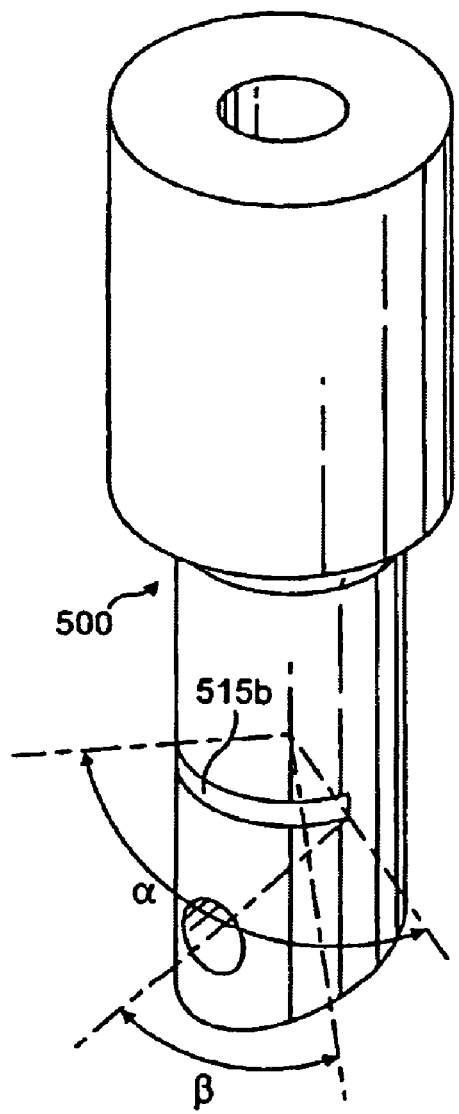
FIGS. 18 and 19 are diagrammatic views in perspective and in sectional perspective, respectively, of a variant embodiment of the perforation and injection element that can be used in connection with the embodiment of the preparation device of FIGS. 14-15.
Figure 19:
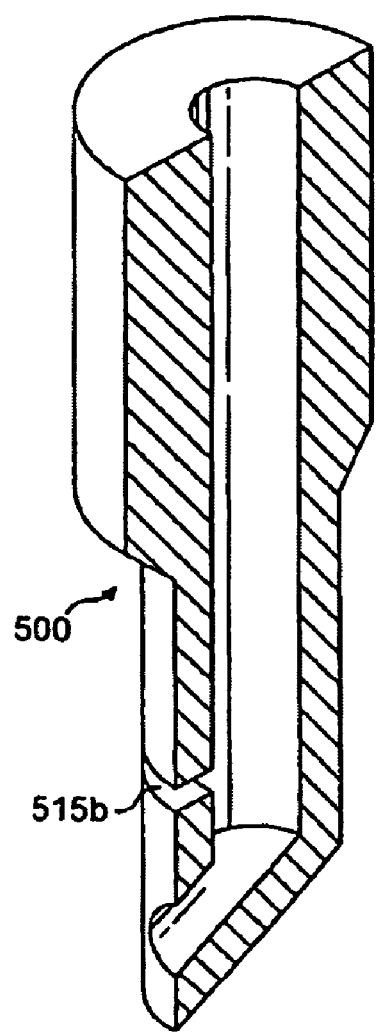

Of course, it is also possible to envisage forming the thin layer of liquid using a single orifice 515b having the form of a slot extending transversely to the longitudinal direction of the element 500, as shown in FIGS. 18 and 19. In such a case, the divergent jet extends over a circular sector that is sufficiently wide to wet substantially all the substance located in the upper part of the capsule.

It will be noted that the orifices 515a and the orifice 515b are, respectively, arranged such that the thin layer of liquid is produced substantially continuously over an angular sector of between 90° and 180° and preferably of the order of 160°. Furthermore, these orifices 515a and 515b are arranged in order to produce a layer of liquid having a thickness of less than or equal to 0.5 mm and preferably less than 0.3 mm. To that end, for each of the orifices 515a, a diameter of the order of 0.5 mm will preferably be chosen and for the orifice 515b a diameter of the order of 0.7 mm will be chosen.

According to an advantageous variant of this second embodiment, the axis of the second injection means 515, i.e. the axis of the orifices 515a and 515b, respectively, defining the direction of the jet of liquid, forms an angle γ of between 0° and 25° with the horizontal and preferably an angle of the order of 15°. The liquid injected by these orifices is thus directed upwards and bounces off, in a first stage, the lower surface of the cap and is returned, in a second stage, towards the bed of substance, being thereby more dispersed. By doing this, the homogeneity of wetting of the substance is improved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A device for preparing a beverage by injecting water through a capsule containing a substance comprising at least one water-injection system for introducing water inside the capsule,
wherein the water-injection system can be switched allowing for a selection to be made between at least two different modes of wetting the substance so as to adapt wetting in accordance with the type of capsule and/or the nature of the substance contained in the capsule,
wherein the water-injection system comprises at least one perforation and injection element that can be displaced in the capsule into at least two distinct positions with reference to a perforated surface of the capsule,
wherein the perforation element can be displaced in accordance with two different depths in the capsule, and
wherein the perforation element can be displaced into a first, upper position in the capsule in which at least one injection spike is uncovered in the capsule and a second, lower position in the capsule in which a greater number of injection spikes are uncovered in the capsule.

2. A device for preparing a beverage by injecting water through a capsule containing a substance comprising at least one water-injection system for introducing water inside the capsule,
wherein the water-injection system can be switched allowing for a selection to be made between at least two different modes of wetting the substance so as to adapt wetting in accordance with the type of capsule and/or the nature of the substance contained in the capsule, wherein the water-injection system comprises at least one perforation and injection element that can be displaced in the capsule into at least two distince positions with reference to a perforated surface of the capsule, and
wherein the water-injection system comprises at least a first perforation and injection element and at least a second perforation and injection element, distinct from the first perforation and injection element, which elements can be displaced relative to one another, each affording a different mode of wetting the substance in the capsule.

3. A device according to claim 2, wherein the first and second elements can be displaced in phase opposition relative to one another into at least a first position in which the first element is in engagement in the capsule and the second element is retracted from the capsule and, conversely, a second position in which the first element is retracted from the capsule and the second element is in engagement in the capsule.

4. A device according to claim 2, wherein the second injection element is a multi-spike plate for perforating, upon its engagement in the capsule, the surface of the capsule at multiple locations.

5. A device according to claim 2, wherein the second element is an injection spike located substantially in a center of the capsule and configured so as to produce multidirectional, divergent sprinkling in the form of at least one thin layer of water.

6. A device according to claim 2, wherein the first element comprises at least one injection point inside the capsule in the form of a jet configured so as to create, in the capsule, a swirling movement that mixes the liquid with the substance.

7. A device for preparing a beverage by injecting water through a capsule containing a substance comprising at least one water-injection system for introducing water inside the capsule,
the water-injection system can be switched allowing for a selection to be made between at least two different modes of wetting the substance so as to adapt wetting in accordance with the type of capsule and/or the nature of the substance contained in the capsule, wherein the water-injection system comprises at least one perforation and injection element that can be displaced in the capsule into at least two distinct positions with reference to a perforated surface of the capsule, wherein an actuating means is provided for displacing at least said perforation and injection element selectively into the two positions by recognizing at least one of a size on a geometry of the capsule, and wherein the actuating means comprises at least one support integral with said perforation and injection element, which support can be displaced elastically relative to a head base, the actuating means comprising at least one detection means for moving the actuating means relative to the head base by complementary engagement of an edge of the capsule.

8. A device according to claim 7, wherein the injection system comprises a single, central injection spike integral with the actuating means so as to be positioned in a low position in the capsule when the detection means does not encounter a complementary edge of the capsule and an upper position in the capsule when the detection means encounters and engages a complementary edge of the capsule.

9. A device according to claim 8, wherein the central injection spike is configured so as to produce multidirectional, divergent sprinkling in the form of at least one thin layer of water.

10. A device according to claim 9, wherein the thin layer extends continuously over the periphery of the spike and sprinkles the substance in the capsule substantially circularly.

11. A device according to claim 9, wherein a number of discontinuous layers of water extend substantially distributed over the periphery of the spike.

12. A device according to claim 9, wherein the thin layer of water has a thickness of less than of equal to 0.5 mm.

13. A device according to claim 8, wherein the spike is configured so as to open due to water pressure against an elastic element, so as to free a passage having a thickness that is determined as a function of the pressure and thereby to create said layer of water.

14. A device according to claim 7, wherein the water-injection system comprises a first injection and perforation element in the form of an off-center injection spike integral with the actuating means and a second injection and perforation element in the form of a multi-spike plate connected to the actuating means by a rocker-type command means and is mounted so that it can be displaced relative to the head base, said multi-spike plate thus being moved into a position for perforation of the surface of the capsule when the detection means of the actuating means encounters and engages a complementary edge of the capsule and is moved into a position of retraction relative to the surface of the capsule, consequently allowing the entry of the injection spike into the capsule when the detection means does not encounter the complementary edge of the capsule.

15. A device according to claim 14, wherein the head base forms a hollow assembly for guiding the multi-spike plate and has sealing rims that close over a collector for receiving the capsule, the injection spike being in communication with said assembly in order to distribute the water in the hollow assembly through or substantially at the level of the multi-spike plate.

* * * * *